(12) United States Patent
Carlson et al.

(10) Patent No.: US 8,694,989 B1
(45) Date of Patent: Apr. 8, 2014

(54) VIRTUAL INSTALLATION ENVIRONMENT

(75) Inventors: Eric O. Carlson, Mountain View, CA (US); Ronnie Misra, Sunnyvale, CA (US); Joshua H. Shaffer, San Jose, CA (US); James Mensch, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1013 days.

(21) Appl. No.: 12/175,394

(22) Filed: Jul. 17, 2008

(51) Int. Cl.
*G06F 9/445* (2006.01)
*G06F 9/44* (2006.01)
*G06F 3/06* (2006.01)

(52) U.S. Cl.
CPC ...... *G06F 9/44* (2013.01); *G06F 9/445* (2013.01); *G06F 8/60* (2013.01); *G06F 8/61* (2013.01); *G06F 8/65* (2013.01); *G06F 3/0667* (2013.01); *G06F 3/0607* (2013.01)
USPC .............................. 717/175; 717/174; 717/176

(58) Field of Classification Search
CPC ............. G06F 9/44; G06F 9/445; G06F 8/60; G06F 8/61; G06F 8/65; G06F 3/0667; G06F 3/0607
USPC .................................. 717/171, 174; 345/700
See application file for complete search history.

(56) References Cited

U.S. PATENT DOCUMENTS

| 7,162,628 | B2 | 1/2007 | Gentil et al. |
| 7,441,113 | B2 | 10/2008 | Chong et al. |
| 2002/0174215 | A1 | 11/2002 | Schaefer |
| 2003/0107588 | A1* | 6/2003 | Elsbree et al. ............... 345/700 |
| 2004/0139309 | A1 | 7/2004 | Gentil et al. |

(Continued)

OTHER PUBLICATIONS

Wine HQ. www.winehq.org, web pages (Nov. 9, 2007), 23 pages.
Office Action for U.S. Appl. No. 12/175,435 mailed Dec. 23, 2011, 27 pgs.
"Wine User Guide," WineHq Mar. 13, 2007 <http://web.archive.org/web/20070101053732/http://winehq.org/docs/en/wineuserguide.pdf> pp. 1-33.

(Continued)

*Primary Examiner* — Chat Do
*Assistant Examiner* — Lynda Dinh
(74) *Attorney, Agent, or Firm* — Womble Carlyle Sandridge & Rice LLP (57) ABSTRACT

A virtual installation process and supporting environment. The virtual installation process may be considered a two-stage installation process. In the first stage a pseudo-installation may occur in which a user is provided an installation experience by a virtual installation environment that stores changes to be made as a result of the installation process. In the second stage of the installation process, the changes that were previously stored may be made to the host system. These changes may include changes to the registry, filesystem and/or any other host system components. The second stage may be initiated by a user attempting to launch the application for the first time. Other triggers may also be supported.

35 Claims, 5 Drawing Sheets

(56) References Cited

U.S. PATENT DOCUMENTS

| | | | |
|---|---|---|---|
| 2006/0048136 A1* | 3/2006 | Vries et al. | 717/174 |
| 2007/0011672 A1 | 1/2007 | Bhide et al. | |
| 2007/0043860 A1 | 2/2007 | Pabari | |
| 2007/0083655 A1 | 4/2007 | Pedersen | |
| 2007/0106993 A1 | 5/2007 | Largman et al. | |
| 2007/0168478 A1 | 7/2007 | Crosbie | |
| 2007/0240149 A1* | 10/2007 | Cromer et al. | 717/171 |
| 2007/0240155 A1* | 10/2007 | Shlomai | 717/174 |
| 2007/0253436 A1 | 11/2007 | Henry et al. | |
| 2008/0263306 A1 | 10/2008 | Tanizawa | |
| 2008/0301676 A1 | 12/2008 | Alpern et al. | |

OTHER PUBLICATIONS

"Winelib User's Guide," WineHq Mar. 13, 2007 <http://web.archive.org/web/20061009065347/http://www.winehq.org/docs/en/winelib-guide.pdf> pp. 1-25.

Office Action for U.S. Appl. No. 12/175,398 mailed Oct. 4, 2011, 14 pgs.

\* cited by examiner

VIRTUAL INSTALLATION ENVIRONMENT

RELATED APPLICATIONS

The present U.S. Patent application is related to the following U.S. Patent applications filed concurrently:
(1) application Ser. No. 12/175,398, entitled "MULTI-STAGE APPLICATION INSTALLATION" and
(2) application Ser. No. 12/175,435, entitled "METHODS AND SYSTEMS FOR USING DATA STRUCTURES FOR OPERATING SYSTEMS".

TECHNICAL FIELD

Installation of applications on a computing device such as a computer system, smartphone, personal digital assistant, etc. More particularly, the invention relates to use of a virtual installation environment for installing new applications on the computing device.

BACKGROUND

When an application is installed on an electronic system, an installer program is typically used to manage the installation process. For example, the Windows® operating system provides the Windows Installer to install and uninstall other applications. Windows Installer allows registry and other system files to be updated or modified during the installation process. All registered trademarks used herein are the property of their respective owners. Other operating systems may provide a different user experience during installation, but some basic operations, for example, modification of files on disk may still be performed.

Some programs exist only for certain operating system and/or hardware platform combinations. Thus, if a user is lacking the correct operating system or hardware, that user is unable to utilize the desired program. Certain solutions exist for this problem including, for example, upgrading operating systems or hardware, which can be expensive, or use of multiple operating systems on a single computing system, which can be expensive and provide technical challenges. Currently, solutions to this problem are expensive or otherwise burdensome to users.

SUMMARY

Described herein are techniques to provide a virtual installation environment that may be used to install an application on a host computing system. In one embodiment, an electronic system may receive an executable application installation program configured to run on within a first operating system. The electronic system receiving the installation program may be configured to run a second operating system. The electronic system may detect beginning execution of the installation program.

In response to the beginning of the installation program, the host electronic system may provide a virtual installation environment for the installation program. The virtual installation program may collect changes to be made to one or more components of the electronic system during installation. The virtual installation environment may store the collected changes to be made to the one or more components and the application to be installed on the electronic system in a predetermined file relationship with the application. The collected changes may be made to the one or more components to be performed in response to access to the application.

In one embodiment, the one or more components of the electronic system include at least a filesystem of the second operating system. In one embodiment, the one or more components of the electronic system include at least a system registry file of the second operating system. In one embodiment, the one or more components of the electronic system include at least a file organization of the second operating system.

In one embodiment, storing the collected changes to be made to the one or more components and the application to be installed on the electronic system in the predetermined file relationship may be accomplished by creating a bundle associated with the application to be installed, storing in the bundle an indication of changes to be made to a registry in association with the installation, and storing in the bundle an indication of changes to be made to a filesystem in association with the installation.

In one embodiment, causing collected changes to the filesystem to be performed in response to access to the application may be accomplished by determining if the access to the application comprises a first access to the application after creation of the bundle, and installing the application if the access is the first access, wherein installation includes causing the stored changes to the registry and the stored changes to the filesystem to be implemented.

In one embodiment, the first operating system may be a WINDOWS-compliant operating system. In one embodiment, the second operating system may be a MacOS-compliant operating system. In one embodiment, the second operating system may be a UNIX-compliant operating system. In one embodiment, the second operating system may be a LINUX-compliant operating system.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Described herein are techniques to provide a virtual installation environment that may be used to install an application on a host computing system. In one embodiment, the application to be installed is configured to function on a computing system using a different operating system than is used on the host computing system. For example, an application may be written to run on a Windows® operating system may be installed on a computing system running a MacOS®, UNIX or LINUX operating system. Registered trademarks used herein are the property of their respective owners.

The virtual installation environment may allow an installer application to run and go through the installation process for the application to be installed without making changes to the filesystem and/or database file (e.g., registry) of the host computing system. In one embodiment, the virtual installation environment tracks a hierarchy of processes created during the installation process to identify a process that is an installer application. If an installer application is identified, all changes attempted by the installer application as well as child processes may be stored in files rather than applied to the host system. In one embodiment, in response to an initiation of the application, the host system may be modified as indicated by the installer application. Thus, the virtual installation environment may provide a two-step installation process, which is described in greater detail below.

Figure 1:
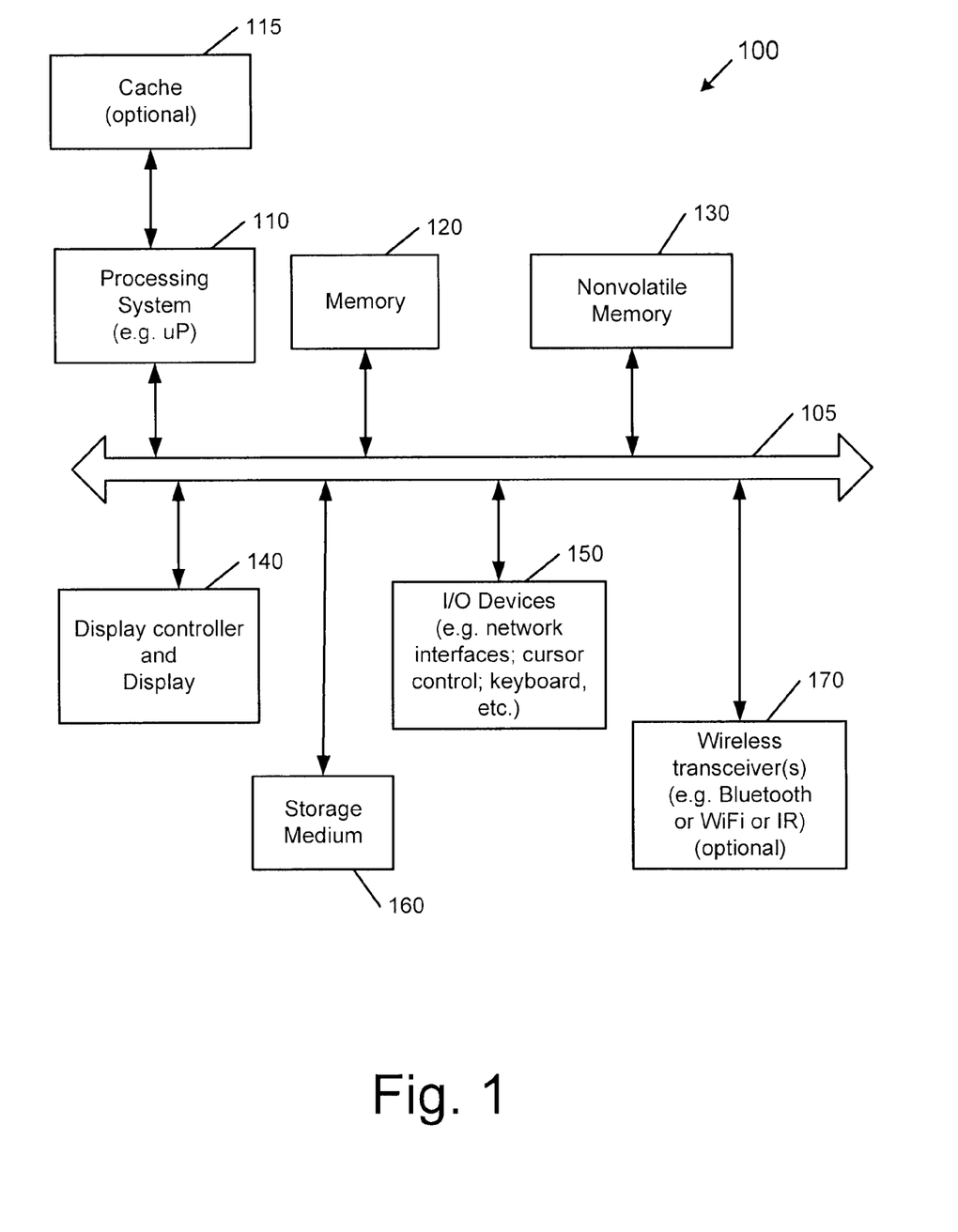
FIG. 1 is a block diagram of one embodiment of a computing system.

FIG. 1 is a block diagram of one embodiment of a computing system. While FIG. 1 illustrates various components of a computing system, it is not intended to represent any particular architecture or manner of interconnecting the components as such details are not germane to the present inventions. Personal digital assistants (PDAs), cellular telephones, media players (e.g. an iPod®), devices which combine aspects or functions of these devices (a media player combined with a PDA and a cellular telephone in one device), network computers, an embedded processing device within another device, and other data processing systems which have fewer components or perhaps more components may also be used to implement the techniques described herein and may be one or more of the data processing systems described herein. The computing system shown in FIG. 1 may, for example, be a Macintosh computer from Apple Inc. or a computer that runs the Windows® operating software from Microsoft Corporation.

Computing system 100 includes bus 105, which is coupled to one or more microprocessors to form processing system 110. Bus 105 is also coupled to memory 120 and to a nonvolatile memory 130, which may be a magnetic hard drive in certain embodiments, or flash memory in other embodiments. Bus 105 is also coupled to display controller and display 140 and one or more input/output (I/O) devices 150.

Further, bus 105 may be coupled to storage medium 260, a hard disk drive or other device where data may be stored. In one embodiment, "snapshots" of files stored on a primary storage device (e.g., hard disk) may be stored on a secondary storage device (e.g., another hard disk). Storage medium 260 may be used to store snapshots and/or other data. In alternate embodiments, snapshots may be stored by other devices including, for example, the device on which the original file is stored.

Processing system 110 may optionally be coupled to cache 115. Processing system 110 may include one or more microprocessors, such as a microprocessor from Intel or IBM. Bus 105 interconnects these various components together in a manner which is known in the art. Typically, the input/output devices 150 are coupled to the system through input/output controllers.

Memory 120 may be implemented as dynamic RAM (DRAM) which provides fast access to data but requires power continually in order to refresh or maintain the data in memory 120. Nonvolatile memory 130 may be a magnetic hard drive or other nonvolatile memory which retains data even after power is removed from the system. While FIG. 1 shows that nonvolatile memory 130 is a local device coupled directly to the rest of the components in the data processing system, it will be appreciated that other embodiments may utilize a nonvolatile memory which is remote from a system, such as a network storage device, which is coupled to the data processing system through a network interface, such as a modem or an Ethernet interface.

Bus 105 may include one or more buses interconnected through various bridges, controllers, and/or adapters. In one embodiment, I/O controller 150 may include a USB compliant adapter for controlling USB compliant peripherals and an IEEE1394 controller for IEEE1394 compliant peripherals. Many other peripheral devices may also be supported.

Aspects of the inventions described herein may be embodied, at least in part, in software. That is, the techniques may be carried out in a computer system or other data processing system in response to its processor or processing system executing sequences of instructions contained in a memory, such as memory 120 or nonvolatile memory 130. In various embodiments, hardwired circuitry may be used in combination with the software instructions to implement the present inventions. Thus, the techniques are not limited to any specific combination of hardware circuitry and software or to any particular source for the instructions executed by the data processing system. In addition, throughout this description, various functions and operations are described as being performed by or caused by software code to simplify description. However, what is meant by such expressions is that the functions result from execution of the code by a processing system.

Figure 2:
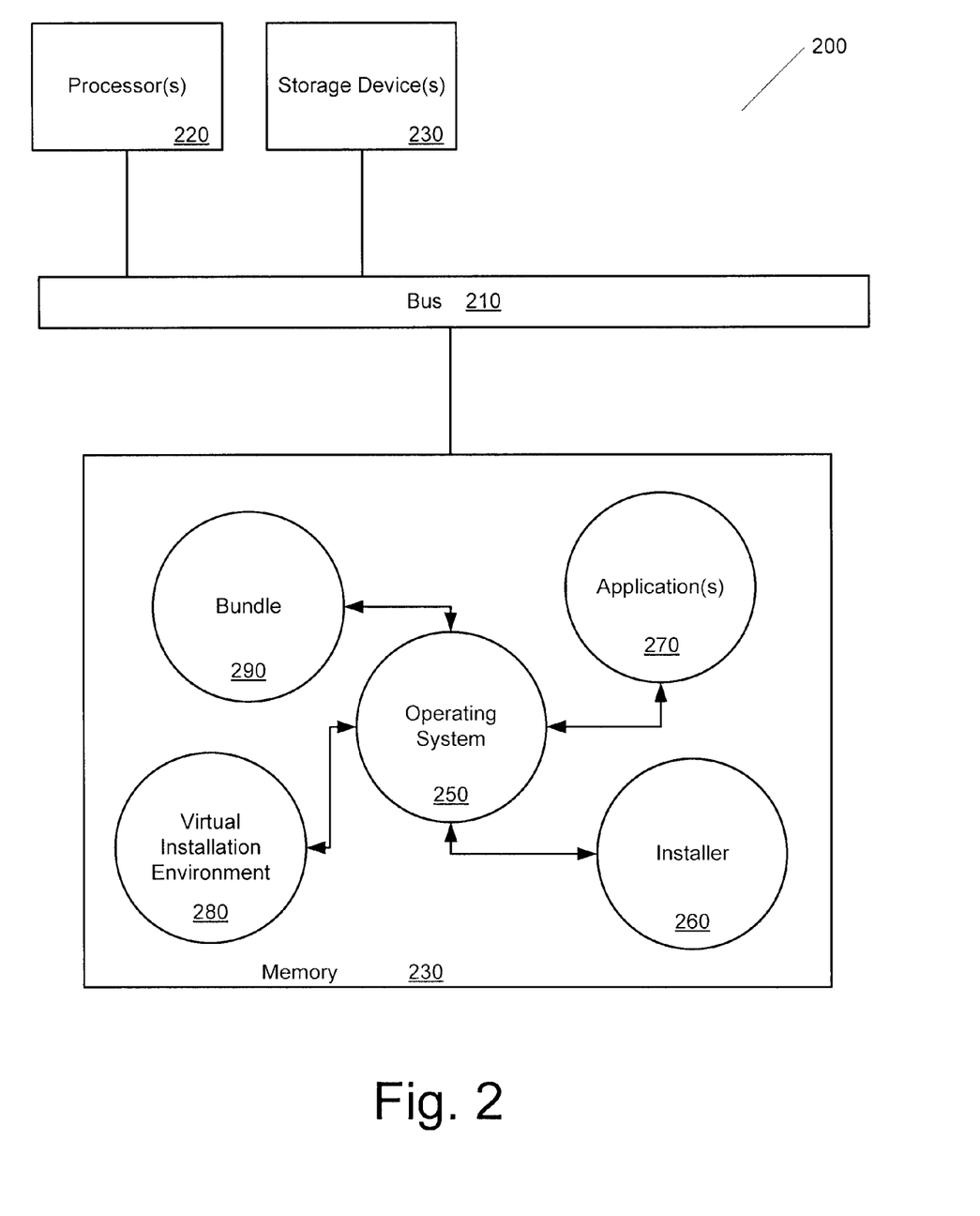
FIG. 2 is a block diagram of a computer system that may provide a virtual installation environment.

FIG. 2 is a block diagram of a computing system that may provide a virtual installation environment. Computing system 200 may include additional components not illustrated in FIG. 2, for example, network interfaces, input/output devices. Computing system 200 may include bus 210 to interconnect processor(s) 220 and storage device(s) 230 as well as memory 240.

When computing system 200 is in an operating condition, operating system 250 may partially or completely loaded in memory 240 while running Any operating system known in the art may be utilized to provide operating system 250. For example, operating system 250 may be a MacOS®, UNIX or LINUX operating system. Computing system 200 may also run one or more application(s) 270, which may also be partially or completely loaded in memory 240. Any suitable applications known in the art may be utilized.

In one embodiment, a user of computing system 200 may wish to install an application that is designed to run on an operating system other than operating system 250. For example, if operating system 250 is a MacOS®-compliant operating system, the application to be installed may be designed to run with a Windows®-compliant operating system. Other operating systems may also be supported. The application to be installed may be provided to computing system 200 via a tangible storage medium, network connection, etc.

In one embodiment, when the user begins the installation process for the application, operating system 250 may detect the initiation of the installation process and cause the installation process to occur within virtual installation environment 280. In one embodiment, the user experience is the same as, or similar to, the installation experience when installing the application within the operating system for which it was designed. For example, virtual installation environment 280 may prompt the user for a location to store particular files, prompt the user for the type of installation to perform, etc.

During the installation process within virtual installation environment 280, changes that would be made to components of computing system 200 (e.g., filesystem, database, nonvolatile memory) are not made, but indications of the changes to be made are stored within one or more files created within virtual installation environment 280. During the installation process, multiple applications and/or threads may be initiated that correspond to the installation process. Changes from each of these applications and/or threads are stored in a similar manner.

In one embodiment, the result of the installation process within virtual installation environment 280 is bundle 290, which may include a version of the application executable within operating system 250, any supporting files necessary as well as one or more files indicating the changes to be made to complete installation. Bundle 290 may be system-independent for computing systems running an operating system compatible with operating system 250. That is, the bundle created by the virtual installation process may be transferred to another computing system for final installation, or the application may be installed on computing system 200.

The virtual installation process may be considered a two-stage installation process. In the first stage a pseudo-installation may occur in which a user is provided an installation experience by a virtual installation environment that stores changes to be made as a result of the installation process. In the second stage of the installation process, the changes that were previously stored may be made to the host system. These changes may include changes to the database, filesystem and/or any other host system components. In one embodiment, the second stage is initiated by a user attempting to launch the application for the first time. Other triggers may also be supported.

Figure 3:
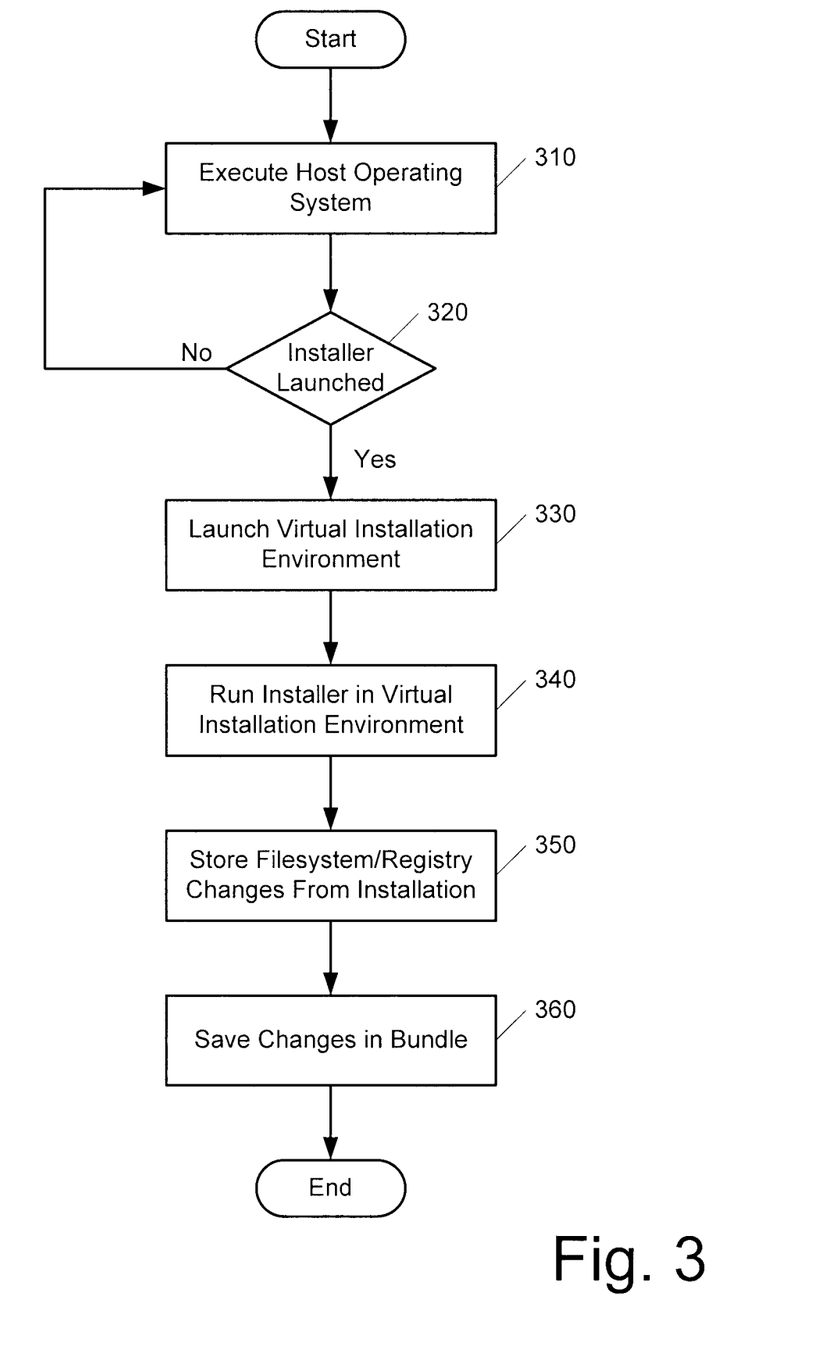
FIG. 3 is a flow diagram of one embodiment of a virtual installation process that may be used to install an application on a computing system.

FIG. 3 is a flow diagram of one embodiment of a virtual installation process that may be used to install an application on a computing system. The host computing system executes a host operating system, 310. As discussed above, any operating system known in the art may be utilized, for example, a MacOS®, UNIX or LINUX operating system. Execution of the host operating system may be accomplished in any manner known in the art and generally continues in the traditional manner except that that the host operating system may determine whether an installer application is launched, 320.

In one embodiment, the host operating system is configured to detect launch of an installer that is configured for a different operating system, for example, a Windows®-compliant operating system. While the detection functionality is described with respect to FIG. 3 as being within the host operating system, the detection functionality may not be included in the host operating system. For example, the detection functionality may be provided by an application other than the host operating system.

When launch of the installer is detected, 320, the virtual installation environment may be launched, 330. In one embodiment, the virtual installation environment may provide all of the application program interfaces (APIs) expected from the operating system for which the application to be installed is designed. For example, if the application is designed to function with a Windows®-compliant operating system, the virtual installation environment may provide an emulation of the APIs provided by the Windows® operating system. The same technique may be applied to any operating system.

Within the virtual installation environment the installer may be executed, 340. In one embodiment, execution of the installer includes the installer providing the user experience of the installer when running on the operating system for which it was designed. For example, the installer may provide prompts for location of files, optional features to be installed, etc. In one embodiment, the virtual installation environment provides a mapping between the default path structure of the operating system for which the installer is designed and the path structure of the host operating system. For example, in a Windows® operating system, an application may be stored at    C:\ProgramFiles\iTunes which may be mapped to    Users\Applications\iTunes Other mappings may also be used.

During the virtual installation process, output from the installer application may be stored in a file, 350. That is, any changes that are to be made by the installation process are stored rather than made. For example, changes to the database, changes to any portion of the host filesystem and/or any other changes may be stored in a file rather than made. In one embodiment, storage of the changes may allow for analysis to determine whether the installation will be successful. In one embodiment, storage of the changes may support rollback, or a removal of the application, should the installation be unsuccessful. Other advantages may also be provided by the storage of changes rather than immediate implementation of the changes.

In one embodiment, the application to be installed along with the file(s) containing the changes to be made to complete the installation are stored in a bundle, 360. The term "bundle" refers to an association between the application to be installed and the file(s) storing the changes to be made. Also, the application to be installed may include one or more files. For example, an executable application file and one or more support files may provide the application to be installed.

Figure 4:
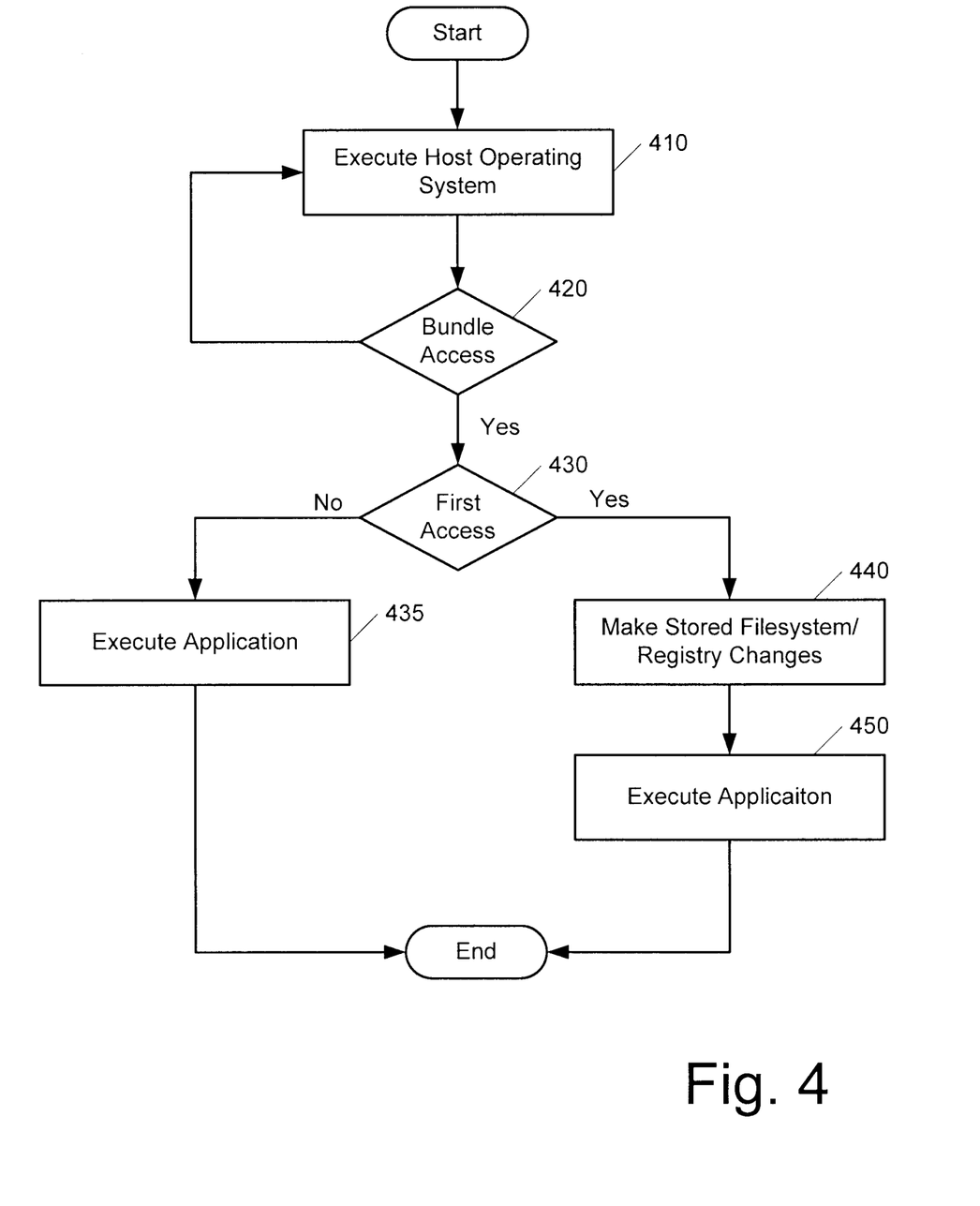
FIG. 4 is a flow diagram of one embodiment of a technique for completion of an installation utilizing a virtual installation environment.

FIG. 4 is a flow diagram of one embodiment of a technique for completion of an installation utilizing a virtual installation environment. The host computing system executes a host operating system, 410. As discussed above, any operating system known in the art may be utilized, for example, a MacOS®, UNIX or LINUX operating system. Execution of the host operating system may be accomplished in any manner known in the art and generally continues in the traditional manner except that that the host operating system may determine whether the bundle created by the virtual installation environment is accessed, 420. In one embodiment, access to the bundle includes launching of the application that was the target of the virtual installation. Other triggers may also be supported.

In one embodiment, the operating system or other system component determines whether the access is a first access, 430. If the access is not the first access, the application is executed in the normal manner, 435, because the installation has been completed. In one embodiment, normal installation of the application includes a host operating system or other system component providing a set of APIs that are expected by the application.

That is, if the application is designed to run with a Windows®-compliant operating system and the host operating system is a MacOS®-compliant operating system, the host operating system may provide an emulation of the Windows® APIs so that function calls and/or other operations by the application are executed properly by the host system. By providing an emulation of the expected APIs, the host system may support execution of an application designed for a different operating system without the presence of the expected operating system on the host computing system. This may allow, for example, an application designed for a Windows® operating system to run on a computing system having a MacOS® operating system without the need for a user to install a Windows®-compliant operating system on the host computing system.

If the access to the application bundle is the first access, 430, after the virtual installation process, the changes indicated by the file(s) stored in the bundle are made, 440. For example, changes to the filesystem, changes to path names, changes to the database, may be made in response to a first access to the application before the application is launched by the host operating system. After the appropriate filesystem, database and/or other changes are made, the application is executed, 450, as discussed above.

Figure 5:
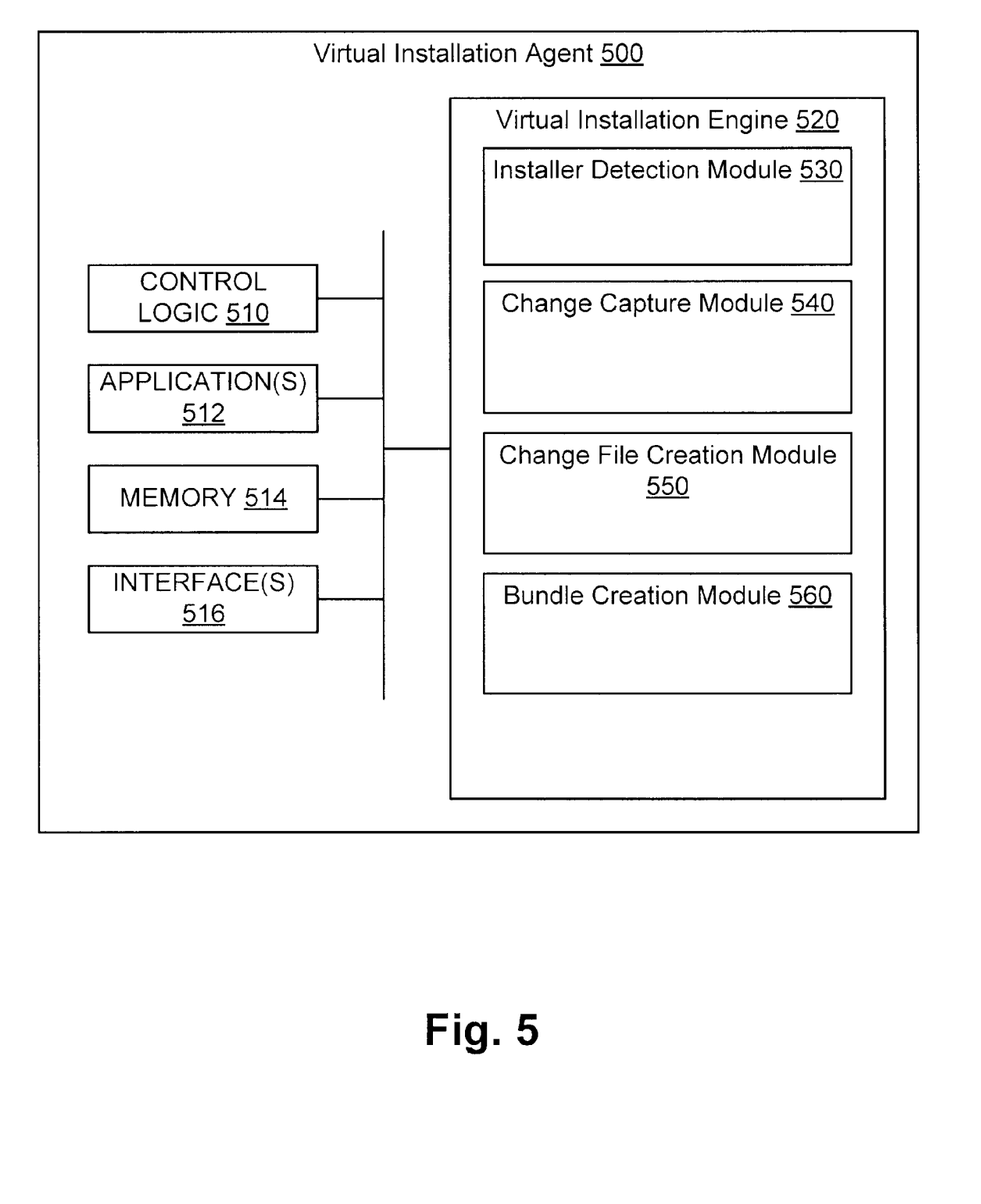
FIG. 5 is a block diagram of one embodiment of an agent that may be utilized in a virtual installation.

FIG. 5 is a block diagram of one embodiment of an agent that may be utilized in a virtual installation. Virtual installation agent 500 includes control logic 510, which implements logical functional control to direct operation of virtual installation agent 500, and/or hardware associated with directing operation of virtual installation agent 500. Logic may be hardware logic circuits and/or software routines. In one embodiment, virtual installation agent 500 includes one or more applications 512, which represent code sequence and/or programs that provide instructions to control logic 510.

Virtual installation agent 500 includes memory 514, which represents a memory device and/or access to a memory resource for storing data and/or instructions. Memory 514 may include memory local to virtual installation agent 500, as well as, or alternatively, including memory of the host system on which virtual installation agent 500 resides. Virtual installation agent 500 also includes one or more interfaces 516, which represent access interfaces to/from (an input/output interface) virtual installation agent 500 with regard to entities (electronic or human) external to virtual installation agent 500.

Virtual installation agent 500 also virtual installation engine 520, which represents one or more functions that enable virtual installation agent 500 to provide the virtual installation environment as described above. The example of FIG. 5 provides several modules that may be included in virtual installation engine 520; however, different and/or additional modules may also be included. Example modules that may be involved in providing the virtual installation environment include installer detection module 530, change capture module 540, change file creation module 550 and bundle creation module 560. Each of these modules may further include other modules to provide other functions. As used herein, a module refers to routine, a subsystem, etc., whether implemented in hardware, software, firmware or some combination thereof.

Installer detection module 530 may detect the launch of an installer application used to install an application. For example, installer detection module 530 may cause the installer to run within the virtual installation environment and/or launch the virtual installation environment. Installer detection module 530 may also perform additional functions related to providing the virtual installation environment.

Change capture module 540 may provide the functionality to capture changes to be made during installation of the target application. Change capture module 540 may, for example, create one or more files that may be used to store changes to be made to various system components including, for example, a database, the registry, components of the file system, etc. Change capture engine 540 may also determine path names and/or provide path name mapping as described above. Change capture module 540 may also perform additional functions related to capture of information related to changes to be made to the host system in response to installation of an application.

Change file creation module 550 may provide functionality related to creation of files to be used to store changes to be made in response to installation of the application. Change file creation module 550 may, for example, cause the host operating system to create one or more files to be used to store the installation changes. Change file creation module 550 may also create file names according to a predetermined strategy or may provide predetermined file names. Change file creation module 550 may also perform additional functions related to file creation in response to installation of an application.

Bundle creation module 560 may provide functionality related to creation of a bundle to be used to store change files and the application to be installed. Bundle creation module 560 may, for example, cause the host operating system to create one or more folders (or other collection of files) to be used to store the installation changes and the application. Bundle creation module 560 may also create folder names according to a predetermined strategy or may provide predetermined file names. Bundle creation module 560 may also perform additional functions related to bundle creation in response to installation of an application.

Additional and/or different modules and functionality may be supported by virtual installation engine 520 and virtual installation agent 500. Any number of modules may be supported by virtual installation engine 520 and virtual installation agent 500.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method comprising:
   receiving an executable application installation program configured to run on a first operating system, wherein an electronic host system receiving the installation program is configured to run a second operating system;
   detecting beginning execution of the installation program;
   providing a virtual installation environment for the installation program in response to detecting beginning execution of the installation program, wherein the installation program collects changes to be made to one or more components of the electronic host system during installation of the executable application, and the collected changes to be made include changes to a filesystem, changes to path names, and changes to a database of the second operating system;
   storing the collected changes to be made to the one or more components and the application to be installed on the electronic host system in files without making the collected changes to the electronic host system;
   in response to a first access of the application to be installed, applying the collected changes to the one or more components of the electronic host system, wherein applying the collected changes comprises:
      providing a mapping between a first path structure of the first operating system and a second path structure of the second operating system, wherein the mapping maps locations of files in the first operating system to locations of files in the second operating system, and
      making the collected changes to the filesystem, path names, and database of the second operating system; and
   executing the application on the electronic host system after the collected changes are applied.

2. The method of claim 1, wherein the one or more components of the electronic host system comprise at least a filesystem of the second operating system.

3. The method of claim 1, wherein the one or more components of the electronic host system comprise at least a system registry file of the second operating system.

4. The method of claim 1, wherein the one or more components of the electronic host system comprise at least a file organization of the second operating system.

5. The method of claim 1, wherein storing the collected changes to be made to the one or more components and the application to be installed on the electronic host system in a predetermined file relationship with the application comprises:
creating a bundle associated with the application to be installed;
storing in the bundle an indication of changes to be made to a registry in association with the installation; and
storing in the bundle an indication of changes to be made to a filesystem in association with the installation.

6. The method of claim 5, wherein the bundle is system-independent for computing systems running the second operating system.

7. The method of claim 1, wherein the first operating system comprises a WINDOWS-compliant, UNIX-compliant, MacOS-compliant, or LINUX-compliant operating system, the second operating system comprises a WINDOWS-compliant, UNIX- compliant, MacOS-compliant, or LINUX-compliant operating system, and the first and second operating systems are different operating systems.

8. The method of claim 1, wherein the second operating system, executing on the electronic host system, provides an emulation of a set of Application Programming Interfaces (APIs) of the first operating system, wherein the set of API's is expected by the application,
thereby enabling function calls by the application to be executed properly by the electronic host system, and supporting execution of the configured to run on a different operating system without the presence of the expected operating system on the electronic host system.

9. The method of claim 1, wherein the second operating system comprises a UNIX-compliant operating system.

10. The method of claim 1, wherein the first operating system comprises a WINDOWS-compliant operating system, and the second operating system comprises a LINUX-compliant operating system.

11. An article comprising a non-transitory computer-readable medium having stored thereon instructions that, when executed by one or more processors, cause the one or more processors to:
receive an executable application installation program configured to run on within a first operating system, wherein an electronic host system receiving the installation program is configured to run a second operating system;
detect beginning execution of the installation program;
provide a virtual installation environment for the installation program in response to detecting beginning execution of the installation program, wherein the installation program collects changes to be made to one or more components of the electronic host system during installation of the executable application, and the collected changes to be made include changes to a filesystem, changes to path names, and changes to a database of the second operating system;
store the collected changes to be made to the one or more components and the application to be installed on the electronic host system in files without making the collected changes to the one or more components;
in response to a first access of the application to be installed, apply the collected changes to the one or more components of the electronic host system, wherein applying the collected changes comprises:
providing a mapping between a first path structure of the first operating system and a second path structure of the second operating system, wherein the mapping maps locations of files in the first operating system to locations of files in the second operating system, and
making the collected changes to the filesystem, path names, and database of the second operating system; and
execute the application on the electronic host system after the collected changes are applied.

12. The article of claim 11, wherein the one or more components of the electronic host system comprise at least a filesystem of the second operating system.

13. The article of claim 11, wherein the one or more components of the electronic host system comprise at least a system registry file of the second operating system.

14. The article of claim 11, wherein the one or more components of the electronic host system comprise at least a file organization of the second operating system.

15. The article of claim 11, wherein the instructions that cause the one or more processors to store the collected changes to be made to the one or more components and the application to be installed on the electronic host system in a predetermined file relationship with the application comprise instructions that, when executed, cause the one or more processors to:
create a bundle associated with the application to be installed;
store in the bundle an indication of changes to be made to a registry in association with the installation; and
store in the bundle an indication of changes to be made to a filesystem in association with the installation.

16. The article of claim 15, wherein the bundle is system-independent for computing systems running the second operating system.

17. The article of claim 15, wherein the medium further stores instructions that, when executed, cause the one or more processors to:
determine if the access to the application comprises a first access to the application after creation of the bundle; and
install the application if the access is the first access, wherein installation includes causing the stored changes to the registry and the stored changes to the filesystem to be implemented.

18. The article of claim 11, wherein the first operating system comprises a WINDOWS-compliant operating system.

19. The article of claim 11, wherein the second operating system comprises a MacOS-compliant operating system.

20. The article of claim 11, wherein the second operating system comprises a UNIX-compliant operating system.

21. The article of claim 11, wherein the second operating system comprises a LINUX-compliant operating system.

22. A system comprising:
one or more buses;
a memory system coupled with the one or more buses; and
one or more processors coupled with the one or more buses,
wherein the processor executes a host operating system stored in the memory system and, while executing the host operating system, carries out steps that include:

receiving an executable application installation program configured to run on a second operating system;

detecting beginning execution of the installation program;

providing a virtual installation environment for the installation program in response to detecting beginning execution of the installation program, wherein the virtual installation program collects changes to be made to one or more components of the host operating system during installation of the executable application, and the collected changes to be made include changes to a filesystem, changes to path names, and changes to a database of the second operating system;

storing the collected changes to be made to the one or more components of the host operating system and the application to be installed on the host operating system in files without making the collected changes to the host operating system;

in response to a first access of the application to be installed, applying the collected changes to the one or more components of the host operating system, wherein applying the collected changes comprises:

providing a mapping between a second path structure of the second operating system and a host path structure of the host operating system, wherein the mapping maps locations of files in the second operating system to locations of files in the host operating system, and making the collected changes to the filesystem, path names, and database of the host operating system; and executing the application on the host operating system after the collected changes are applied.

23. The system of claim 22, wherein the one or more components of the host operating system comprise at least a filesystem.

24. The system of claim 22, wherein the one or more components of the host operating system comprise at least a registry file.

25. The system of claim 22, wherein the one or more components of the host operating system comprise at least a file organization.

26. The system of claim 22, wherein storing the collected changes to be made to the one or more components of the host operating system and the application to be installed on the electronic host system in a predetermined file relationship with the application comprise the processor:

creating a bundle associated with the application to be installed;

storing in the bundle an indication of changes to be made to a registry in association with the installation; and storing in the bundle an indication of changes to be made to a filesystem in association with the installation.

27. The system of claim 26, wherein the bundle is system-independent for computing systems running the host operating system.

28. The system of claim 26, wherein causing collected changes to the filesystem to be performed in response to access to the application comprises the processor:

determining if the access to the application comprises a first access to the application after creation of the bundle; and installing the application if the access is the first access, wherein installation includes causing the stored changes to the registry and the stored changes to the filesystem to be implemented.

29. The system of claim 22, wherein the second operating system comprises a WINDOWS-compliant operating system.

30. The system of claim 29, wherein the host operating system comprises a MacOS-compliant operating system.

31. The system of claim 29, wherein the host operating system comprises a UNIX-compliant operating system.

32. The system of claim 29, wherein the host operating system comprises a LINUX-compliant operating system.

33. An apparatus, comprising:

means for receiving an executable application installation program configured to run on a first operating system, wherein an electronic host system receiving the installation program is configured to run a second operating system;

means for detecting beginning execution of the installation program;

means for providing a virtual installation environment for the installation program in response to detecting beginning execution of the installation program, wherein the installation program collects changes to be made to one or more components of the electronic host system during installation of the executable application, and the collected changes to be made include changes to a filesystem, changes to path names, and changes to a database of the second operating system;

means for storing the collected changes to be made to the one or more components and the application to be installed on the electronic host system in files without making the collected changes to the electronic host system;

means for applying the collected changes to the one or more components in response to a first access of the application; and means for executing the application on the host system after the collected changes are applied.

34. The apparatus of claim 33, wherein the means for storing the collected changes to be made to the one or more components and the application to be installed on the electronic system in a predetermined file relationship with the application further comprise:

means for creating a bundle associated with the application to be installed;

means for storing in the bundle an indication of changes to be made to a registry in association with the installation; and means for storing in the bundle an indication of changes to be made to a filesystem in association with the installation.

35. The apparatus of claim 34, wherein the means for causing collected changes to the filesystem to be performed in response to access to the application further comprise:

means for determining if the access to the application comprises a first access to the application after creation of the bundle; and means for installing the application if the access is the first access, wherein installation includes causing the stored changes to the registry and the stored changes to the filesystem to be implemented.

* * * * *